(12) United States Patent
Beagell et al.

(10) Patent No.: US 6,640,844 B1
(45) Date of Patent: Nov. 4, 2003

(54) FLUID DRAINING SYSTEM AND METHOD

(75) Inventors: Gary Beagell, Binghamton, NY (US); Randy Ritter, Port Crane, NY (US)

(73) Assignee: Gary's U-Pull-It, Binghamton, NY (US)

( * ) Notice: Subject to any disclaimer, the term of this patent is extended or adjusted under 35 U.S.C. 154(b) by 15 days.

(21) Appl. No.: 09/944,991

(22) Filed: Sep. 4, 2001

(51) Int. Cl.[7] ................................................ B65B 31/04
(52) U.S. Cl. .............................. 141/65; 141/1; 141/98; 141/330; 184/106
(58) Field of Search ................................ 141/65, 98, 1, 141/59, 329, 330; 184/1.5, 106; 210/241, 513

(56) References Cited

U.S. PATENT DOCUMENTS 6,106,712 A * 8/2000 New .......................... 210/241

* cited by examiner

Primary Examiner—Gregory L. Huson
Assistant Examiner—Peter deVore
(74) Attorney, Agent, or Firm—Salzman & Levy

(57) ABSTRACT

A fluid drainage system is described for automobiles and other abandoned or wrecked vehicles. A vehicle is elevated on a lift and a puncturing apparatus is positioned under the gas tank. A protuberance on this apparatus punctures the gas tank and the gasoline in funneled through the apparatus into a receptacle. Pump tubes are inserted into the containers holding the brake fluid, power steering fluid, windshield wiper fluid, and antifreeze overflow, and these fluids are extracted into to individual receptacles. A lift unevenly elevates the vehicle and drains various automotive fluids, such as radiator fluid, transmission fluid, differential fluid and antifreeze. All of these fluids are stored in a common holding tank and are then pumped to a liquid, gravity separator, which separates the mixture into its component parts.

14 Claims, 3 Drawing Sheets

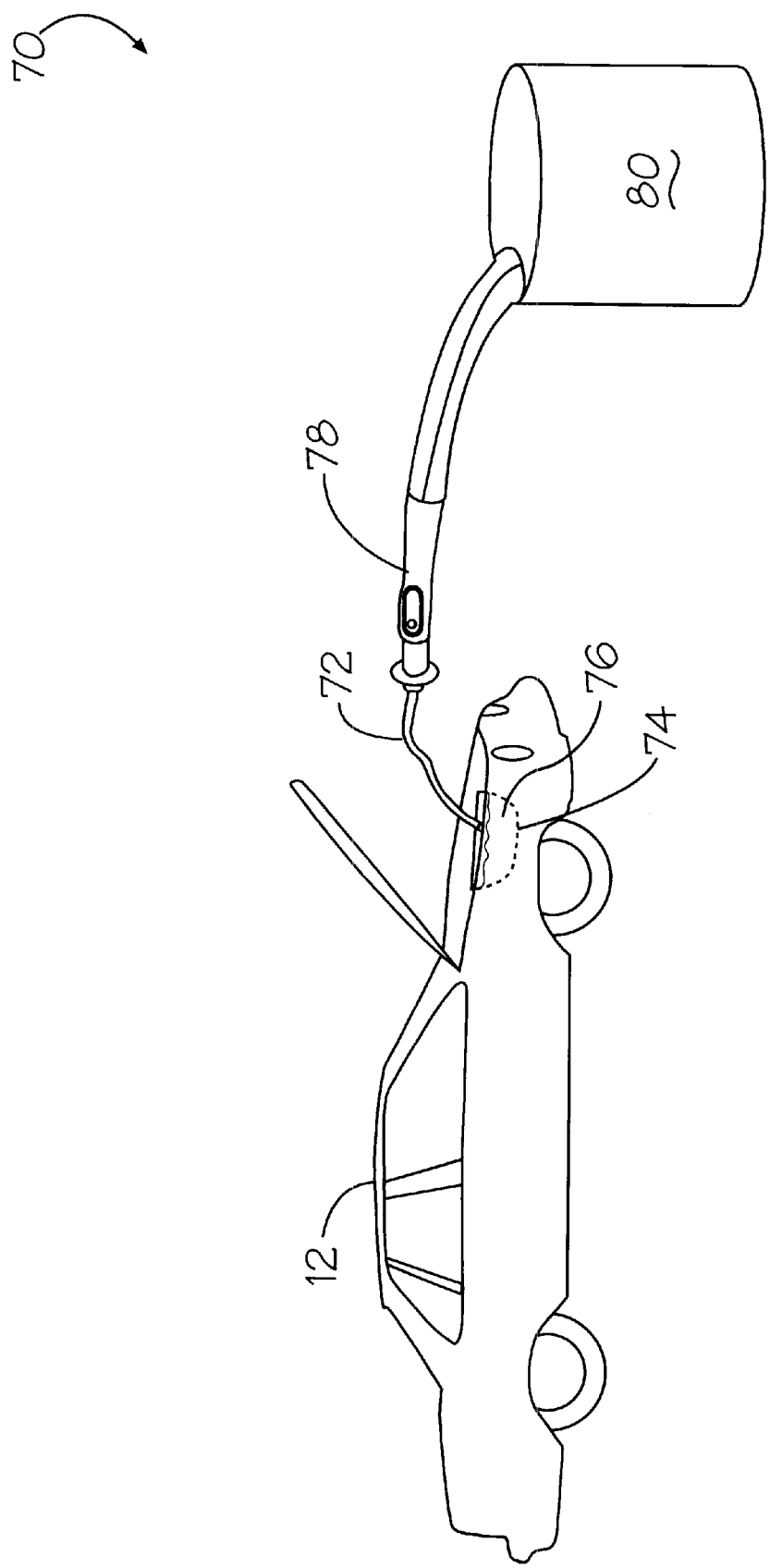

FLUID DRAINING SYSTEM AND METHOD

FIELD OF THE INVENTION

The present invention relates to fluids and auto-wrecking systems and, more particularly, to a system and method for thoroughly draining fluids from automobiles into a common holding tank and separating the fluid into its composite parts.

BACKGROUND OF THE INVENTION

In the art of metal salvage, auto-stripping and auto-wrecking, an abandoned vehicle or an auto wreck must be drained of its fluids prior to being processed. Fluids like ethylene glycol, coolants, antifreeze, gasoline, lubricants, and brake, steering and transmission fluids can be detrimental to ground and water environments. Such fluids must be properly contained or disposed of prior to processing the vehicle. Automobiles cannot be crushed with their fluids still contained within their respective reservoirs and vehicular tanks. Even storage of a fluid-filled vehicle in an auto-wrecker's junkyard can pose a hazard because gradual corrosion will cause the fluid tanks and reservoirs to leak.

A problem with removing the various fluids at the wrecking establishment is the expense and inconvenience of draining and storing each fluid in its own separate container. Keeping the fluids separated is beneficial, since many of them can be recycled. Recycling helps to defray the cost of their removal and storage.

Another problem with fluid removal is the cost of the capital equipment, and the need for additional storage space. The drainage equipment and storage requirement use room that could better be used for storing additional wrecks.

The present invention incorporates a system by which many of the aforementioned problems are resolved.

The current invention provides a drainage facility that can remove a vehicle's fluids with alacrity and dispatch. The system comprises means for pumping and puncturing various fluid tanks and reservoirs contained in an automobile. Some of the fluids from the vehicle are pumped or drained directly into individual storage containers. Once punctured, all of the remaining fluids are drained from their reservoirs into a common holding tank or into an individual tank. From the holding tank, the fluids are then pumped to a gravity separator. The gravity separator separates the mixture into its component parts (e.g., mixture of oils and antifreeze) according to the density of each liquid. Each fluid can then be re-used, or properly disposed of.

SUMMARY OF THE INVENTION

In accordance with the present invention, a vehicle drainage system is disclosed. A hydraulic lift unevenly elevates and tilts the vehicle such that all of its fluids flow towards the lowest point in their respective container. Each fluid container is punctured and the radiator fluid, transmission fluid, differential fluid, antifreeze, etc., drains from the automobile, and is stored in a common holding tank. Other fluids, such as brake fluid, power steering fluid, windshield wiper fluid and antifreeze overflow, are pumped out of their respective containers into individual receptacles, while gasoline is drained into its own receptacle. The liquids in the common holding tank are pumped into a gravity-separating unit, which divides the mixture into its component fluids (e.g., mixture of oils and antifreeze) according to their densities.

It is an object of this invention to provide an improved fluid drainage system and method for automobiles.

It is another object of the invention to provide a system to drain and separate the various fluids from automobiles.

BRIEF DESCRIPTION OF THE DRAWINGS

A complete understanding of the present invention may be obtained by reference to the accompanying drawings, when considered in conjunction with the subsequent detailed description, in which:

FIG. 3 illustrates a perspective view of the pumping system of this invention.

For purposes of brevity and clarity, like components and elements of the apparatus of this invention will bear the same designations or numbering throughout the figures.

DESCRIPTION OF THE PREFERRED EMBODIMENT

Generally speaking, the invention features a fluid drainage system for vehicles. A vehicle is elevated on a lift and a puncturing apparatus, movable along both the x and the y axis, is positioned under the gas tank. A protuberance on this apparatus punctures the gas tank and the gasoline is funneled through the apparatus into a receptacle. Tubes are inserted into vehicle containers holding the brake fluid, power steering fluid, windshield wiper fluid, and antifreeze overflow. These fluids are pumped into individual corresponding receptacles. A hydraulic lift unevenly elevates and tilts the vehicle such that all of its remaining fluids flow towards the lowest point in their respective container. Each fluid container is punctured and the radiator fluid, transmission fluid, differential fluid, antifreeze, etc., is drained from the automobile and stored in a common holding tank. The composite fluid in the holding is pumped into a gravity-separating unit, which divides the mixture into its component fluids according to their densities.

Figure 1:
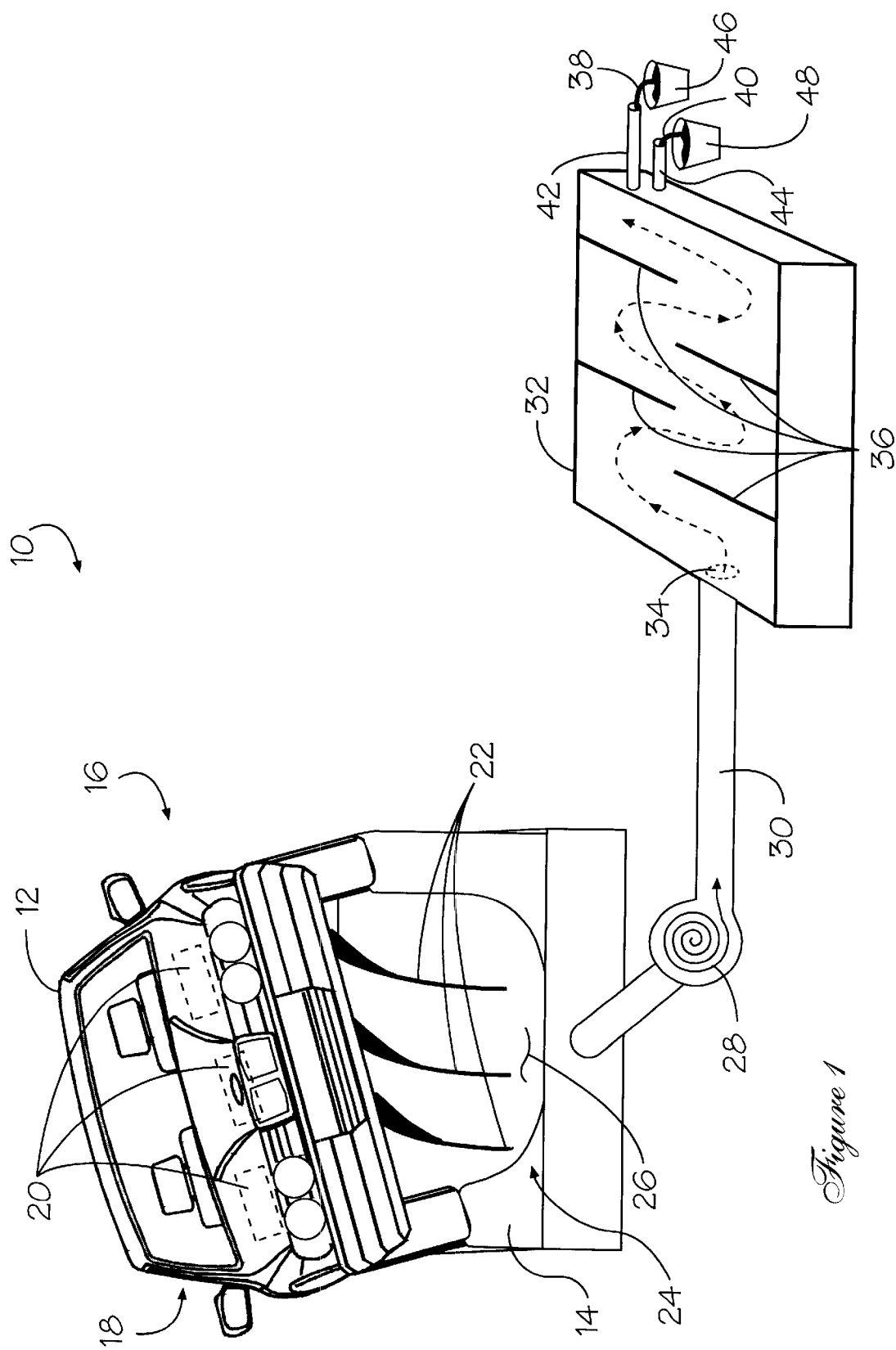
FIG. 1 illustrates a schematic view of the drainage system of this invention.

Now referring to FIG. 1, a schematic view is illustrated for the fluid draining system 10 of this invention. A car 12 is unevenly elevated using a lift 14. Part of the lift 14 raises one side of the car (illustrated as the driver's side 16) higher than another portion of the car (illustrated as the passenger side 18).

Storage vessels 20 house various automotive fluids 22 within car 12. Fluids 22 drain into a common holding tank 24 when their containers 20 are punctured. The common holding tank 24 collects all of the fluid drained from car 12 and forms a composite fluid 26.

The composite fluid 26 is transported via a pump 28 and conduit 30 to a gravity separator 32. The fluid 26 enters gravity separator 32 through an opening 34 and flows under the influence of gravity past several baffles 36. The liquids separate under gravitational influence into a mixture of oils 38 and recyclable antifreeze 40 by reason of their different densities. When the fluids 38, 40 reach the end of the path in the gravity separator 32, they drain out of separator 32 through 42, 44 located at different heights. Individual holding tanks 46, 48 are filled with a mixture of oils 38 and antifreeze 40, respectively.

The resulting fluids 38, 40 can then be either re-used, stored in larger tanks (not shown) or they can be properly disposed of. Without the separation process, the composite fluid 26 would not be effectively usable again or properly disposable.

The mixture 26 in the common holding tank 24 can be fed to other types of separators (not shown), other than gravity separator 32, but gravity separation is preferred because it is simple and does not require expensive equipment.

Feeding the different fluids 22 into a common holding tank 24 is a great advantage since the fluids 22 in vehicle 12 can be drained simultaneously. This allows the system 10 to service more vehicles 12 in the same operating period.

Figure 2:
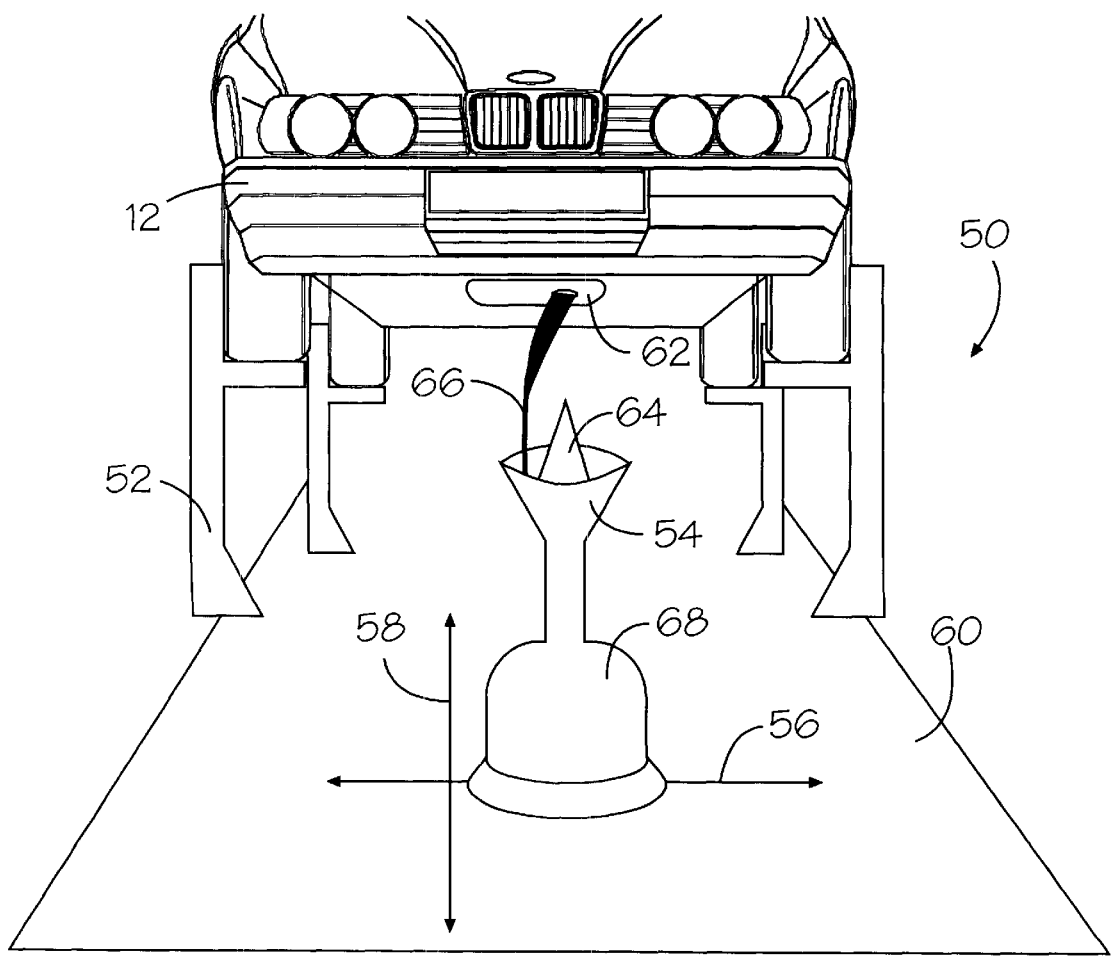
FIG. 2 illustrates a perspective view of the gas tank drainage system of this invention.

Now referring to FIG. 2, a perspective view of the gas tank drainage system 50 of this invention is illustrated. A vehicle 12 is elevated on a lift 52, above a puncturing apparatus 54 that is movable along both the x and y axis 56, 58 in an area 60. The puncturing apparatus 54 is positioned under gas tank 62. A protuberance 64 on this apparatus 54 punctures gas tank 62, so that gasoline 66 is drained and funneled through the apparatus 54 and into a receptacle 68.

Now referring to FIG. 3, a perspective view of the pumping system 70 of this invention is illustrated. Tubes 72 are inserted into containers 74 of vehicle 12 holding different fluids 76, including brake fluid, power steering fluid, windshield wiper fluid, and antifreeze overflow. These fluids 76 are individually pumped into individual, corresponding receptacles 80. A control device 78 is in place in order to control the flow of fluid 76 through the system 70. The fluids 76 can be re-used, recycled, or properly disposed of once they are contained in individual receptacles 80.

The systems 10, 50, 70 provide a means by which fluids 22, 66, 76 can be easily and thoroughly removed from the vehicle 12. The vehicles 12 can then be stored, demolished or abandoned without concern for leaking fluids.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A fluid draining method for draining different fluids from vehicles for the purpose of preparation for auto salvage storage, comprising the steps of:
   draining different fluids from individual containers of a vehicle into a common holding tank or reservoir, said draining step being performed by at least one of the group: puncturing, rupturing each of said individual containers;
   thereafter, pumping said fluid mixture to a separating station;
   separating at least one fluid from said different fluids for the purpose of recycling; and
   store said fluids in individual storage units.

2. The method in accordance with claim 1, wherein said vehicle is elevated unevenly, allowing said fluids to be drained thoroughly.

3. The method in accordance with claim 2, wherein said vehicle can be tilted in a manner which allows for the optimum draining of said fluids.

4. The method in accordance with claim 1, wherein said draining of different fluids comprises draining at least one of the group: radiator fluid, transmission fluid, differential fluid, gasoline and antifreeze.

5. The method in accordance with claim 1, wherein said draining step comprises draining said different fluids substantially simultaneously into said common holding tank or reservoir.

6. The method in accordance with claim 1, the steps further comprising pumping at least one fluid from said vehicle.

7. The method in accordance with claim 6, wherein said pumping of said at least one fluid comprises pumping at least one of the group: brake fluid, power steering, windshield wiper fluid and antifreeze overflow.

8. The method in accordance with claim 6, wherein said at least one fluid is pumped into individual storage units.

9. The method in accordance with claim 1, wherein said separating step is accomplished, at least in part, by a gravity separator.

10. A fluid draining system, comprising:
   a) a lift for elevating and tilting a vehicle along both the x and y axis into any desired position;
   b) a common holding tank for storing different fluids extracted from at least one vehicle;
   c) a fluid separator operatively connected to said common holding tank for completely separating fluid mixtures into their individual component liquids;
   d) a plurality of individual holding tanks for storage of said individual component liquids;
   e) at least one fluid pump for pumping one or more of said individual component liquids directly from their respective reservoir, contained within a vehicle, to at least one of said individual holding tanks.

11. The fluid draining system in accordance with claim 10, wherein said fluid separator comprises a gravity fed fluid separator.

12. The fluid draining system in accordance with claim 10, wherein said lift elevates one portion of said vehicle higher than another portion thereof.

13. The fluid draining system in accordance with claim 10, further comprising a plurality of individual holding tanks operatively connected to said fluid separator for receiving respective liquids there from.

14. The fluid draining system in accordance with claim 10, wherein at least one of said individual holding tanks is intended to receive waste fuel directly from said vehicle's fuel tank.

* * * * *